United States Patent [19]

Bullivant et al.

[11] Patent Number: 4,811,835
[45] Date of Patent: Mar. 14, 1989

[54] VIBRATORY MATERIAL FEEDER

[75] Inventors: Kenneth W. Bullivant, Chadds Ford, Pa.; Ronald V. Ostenbridge, Franklin-Ville, Thomas E. Leonix, Cape May Courth, both of N.J.

[73] Assignee: K-Tron International, Inc., Pitman, N.J.

[21] Appl. No.: 225,593

[22] Filed: Jul. 28, 1988

Related U.S. Application Data

[63] Continuation of Ser. No. 916,413, Oct. 7, 1986, abandoned.

[51] Int. Cl.$^4$ ............................................... B65G 27/32
[52] U.S. Cl. .................................... 198/762; 198/769; 318/114; 318/127; 318/128
[58] Field of Search ............................ 310/27, 34, 35; 318/114, 118, 128, 130, 132; 198/751, 761, 762, 764, 769

[56] References Cited

U.S. PATENT DOCUMENTS

| | | |
|---|---|---|
| 2,862,164 | 11/1958 | Kuhner . |
| 2,917,691 | 12/1959 | De Prisco et al. ............... 318/118 |
| 2,997,158 | 8/1961 | Moskowitz et al. . |
| 3,355,633 | 11/1967 | Klix . |
| 3,447,051 | 5/1969 | Attwood et al. ............... 318/118 X |
| 3,474,316 | 10/1969 | Scott . |
| 3,748,553 | 7/1973 | Reiner ............................ 318/27 X |
| 3,922,589 | 11/1975 | Peckingham . |
| 4,049,997 | 9/1977 | McGhee ......................... 318/128 |
| 4,101,816 | 7/1978 | Shepter . |
| 4,216,416 | 8/1980 | Grace . |
| 4,331,263 | 5/1982 | Brown . |
| 4,350,243 | 9/1982 | Weyandt . |
| 4,354,618 | 10/1982 | Weyandt . |
| 4,395,665 | 7/1983 | Buchas . |
| 4,401,925 | 8/1983 | Brander . |
| 4,441,060 | 4/1984 | Hamer et al. . |
| 4,479,098 | 10/1984 | Watson . |
| 4,490,654 | 12/1984 | Buchas . |
| 4,496,884 | 6/1985 | Hamer et al. . |
| 4,517,500 | 5/1985 | Gotal et al. . |
| 4,547,712 | 10/1985 | Gotal et al. . |
| 4,562,385 | 12/1985 | Rabson ........................... 318/132 X |
| 4,663,574 | 5/1987 | Ward, Jr. ........................ 318/128 |
| 4,698,576 | 10/1987 | Maresca . |

FOREIGN PATENT DOCUMENTS 58-113014 7/1983 Japan .
58-193814 11/1983 Japan .
58-212508 12/1983 Japan .

OTHER PUBLICATIONS

Vibrationsfordersystem mit Resonanzfrequenz-Steuerung, G. Strehle, 1985 (pp. 45–47).

*Primary Examiner*—R. Skudy
*Attorney, Agent, or Firm*—Parkhurst, Oliff & Berridge

[57] ABSTRACT

Mechanical resonance of the vibratory feeder is maintained by minimizing a phase angle difference between substantially sinusoidal drive voltage and current wave forms. The mass flow rate of material being fed is controlled by controlling the electrical power applied to the vibratory feeder compared with a desired electrical power computed from a desired flow rate. The preferred embodiment includes synthesized drive wave forms which are variable in frequency and amplitude in order to maintain the vibratory feeder in mechanical resonance at the desired flow rate. Resonant operation and accurate material flow are accomplished without use of electromechanical vibration sensors and control is accomplished using the magnitude and phase relationships between the applied voltage and current drive wave forms.

15 Claims, 8 Drawing Sheets

VIBRATORY MATERIAL FEEDER

This is a continuation of application Ser. No. 916,413, filed Oct. 7, 1986, now abandoned.

BACKGROUND OF THE INVENTION

The present invention relates to vibratory material feeders driven in mechanical resonance.

Vibratory feeders exhibit many advantages over other types of material feeding systems such as belt feeders or motor driven auger feeders. These other feeders, while exhibiting excellent long-term control over material feed often have non-uniform material feed over the short term, and are often unacceptable for applications such as ingredient mixing which requires specified material ratios be maintained at all times.

Vibratory feeders are also mechanically simpler than these other types of feeders because they operate without bearings, motor brushes, seals and the like. This results in a higher reliability and lower cost material feeder compared with other types of material feeders, and since vibratory feeders typically have no sparking electrical contacts, they are readily adaptable to highly explosive hazardous environments.

In addition, since the only component of the vibratory material feeder that is in direct contact with the material being fed is a feed tray, or the like, cleaning is greatly simplified. Vibratory feeders also exhibit excellent temperature stability, and are capable of operating with high efficiency, for example, feeding 25 tons of material per hour with only 60 watts electrical input.

However, commercially available vibratory feeders are not without disadvantage. For example, since vibratory feeders depend upon the frequency of mechanical resonance of the feeder, which varies with temperature, feed rates are affected by ambient temperature changes and temperature changes due to warm-up. Feeders driven from the power line exhibit a high degree of sensitivity to line voltage and frequency variation. Also, the material feed rate is often not easily controllable because of the non-linear relationship existing between the actual feed rate and a desired command value, and the fact that the feed rate is not zero based, (i.e., a power greater than zero must be applied to the vibratory feeder before material will begin feeding). This offset changes with type of material and material headload.

Another typical disadvantage of vibratory feeders is that they provide no indication of material feed which makes sensing of clogs and the like very difficult. Also, when materials of different densities are used, or when the feeding tray is changed, tedious mechanical tuning is required in order to reestablish the desired mechanical resonant point corresponding to the drive frequency of the vibratory actuator. Finally, since most feeders are driven with phase control of a voltage derived from a power line, unacceptable electrical interference is generated.

Therefore, while exhibiting many advantages over existing material feeding systems, the vibratory feeder has been limited by the aforementioned disadvantages.

It has been recognized that maximum efficiency occurs when a vibratory feeder is driven at the natural mechanical frequency of the system. However, conventional vibratory feeder systems are typically driven at a frequency different from the natural frequency because large and uncontrollable vibrations may occur unless sufficient damping is provided. For this reason, the conventional system is usually designed so that its natural mechanical frequency is above or below the electrical drive frequency resulting in a corresponding loss of efficiency.

Recently, attempts have been made to intentionally drive vibratory feeders at their natural frequency. However, these systems require electromechanical sensors for detecting the frequency of the mechanical vibration for ultimately controlling the drive frequency, or are driven with non-sinusoidal electrical drive wave forms which may result in undesirable mechanical vibrations at high harmonic frequencies. Thus, these known resonant vibratory material feeders exhibit undesirable mechanical complexity or unpredictable effects of high harmonic vibration, with associated unavoidable material feed rate inaccuracies.

SUMMARY OF THE INVENTION

Accordingly, it is a primary object of the invention to provide a vibratory material feeder driven in mechanical resonance with substantially sinusoidal drive without need for electromechanical sensors for sensing the mechanical vibration frequency of the feeder.

According to the invention, resonance is maintained by minimizing a phase angle difference between sinusoidal drive voltage and current wave forms. In addition, the mass flow rate of the material feeder is controlled by controlling the electrical power applied to the vibratory feeder. Thus, the vibratory feeder of the present invention operates in resonance, thereby maximizing efficiency, and with accurate control of material feed without electromechanical sensors or other transducers and without exciting the system with harmonics higher than the drive frequency applied.

The preferred embodiment is a microprocessor based controller including a wave form generator for synthesizing the sinusoidal voltage drive wave form. This synthesized wave form is variable in frequency and amplitude under control of the microprocessor in order to maintain the vibratory feeder in mechanical resonance at the desired flow rate.

Since mechanical resonance and flow rate are determined from the electrical drive wave forms, the need for sensors for these quantities is completely eliminated, and reliability and accuracy are improved. Also, since a sinusoidal drive is used, calculation of applied electrical power, which is highly correlated to mass flow of material, is simple and highly accurate.

Also according to the present invention, the desired mass flow rate of material is converted to a desired applied power by using the substantially linear relationship between applied electrical power and actual material flow rate. The desired applied power is then used to control the actual applied power in order to control actual mass flow at the desired rate.

The frequency of the applied power is constantly adjusted in order to maintain a minimum phase shift between the sinusoidal voltage and current applied to the electromagnetic vibrator. The present invention seeks out the point of mechanical resonance and varies the frequency of applied electrical power to correspond to that mechanical resonance. The present invention is therefore completely independent of any of the aforementioned deleterious consequences of dependence on power line frequency, and the requirement of mechanically tuning the vibratory system. The invention is also capable of tracking the mechanical resonance despite changes due to ambient temperature or warm-up.

It has been found that an applied frequency range of between 40 and 80 Hz is acceptable for most vibratory material feeder applications. By externally programming the microprocessor embodying the present invention, it is possible to customize a particular controller for highly accurate application within a desired frequency range or material flow range. This programability can be accomplished with the use of external switches, or the like, which allow a single controller to be used with an entire range of vibratory feeders.

Other objects feature and advantages of the claimed invention will become apparent to those skilled in the art from the following detailed description of the preferred embodiment with specific reference to the drawings.

DETAILED DESCRIPTION

Figure 1:
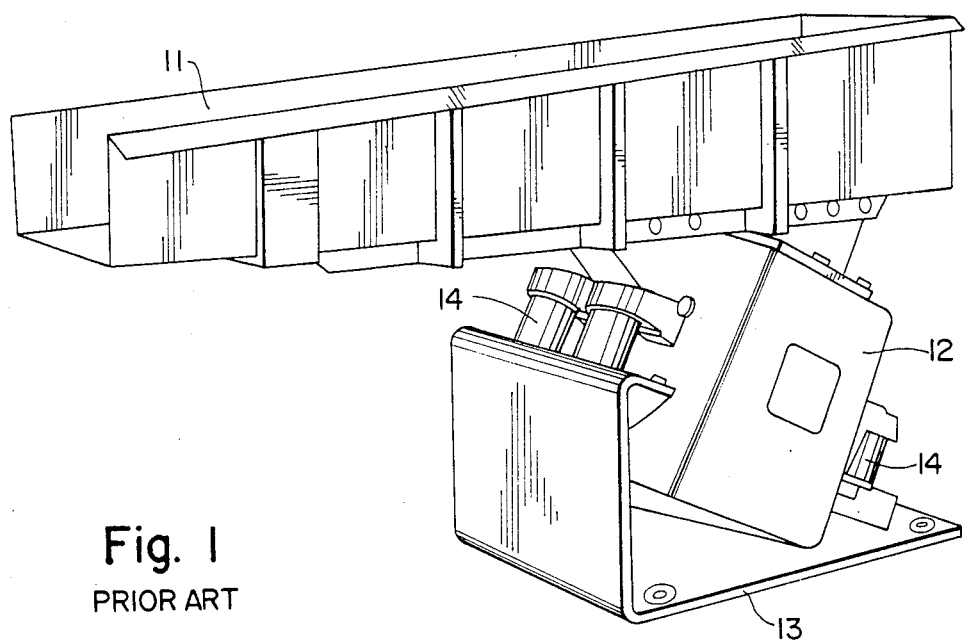
FIG. 1 is a mechanical detail of a vibratory feeder of the present invention.

Referring to FIG. 1, the mechanical detail of a vibratory material feeder of the present invention is shown. The mechanical structure of the feeder, and the electromechanical actuator can be, for example, that presented in U.S. Pat. No. 2,997,158, issued Aug. 22, 1961, the disclosure of which is incorporated herein by reference.

The feeder includes a tray assembly 11 which is vibrated by an electromechanical actuator 12 which, in turn, is mounted to base 13. Base 13 is typically fixedly mounted to a mounting member (not shown).

Actuator 12 is suspended from base 13 by flexible mountings 14 which aid in mechanically isolating the vibrating system comprising tray 11 and actuator 12 from base 13.

Actuator 12 includes coil wrapped cores and permanent magnets and is driven by a substantially sinusoidal voltage drive wave form. As actuator 12 vibrates, tray 11 will be moved alternately to the left and right which will urge material lying in the rear part of tray 11 to be advanced along tray 11 toward the left. Although not shown, it will be understood that as material discharges from the left of tray 11, new material is supplied to tray 11 from a material hopper or the like.

Figure 2:
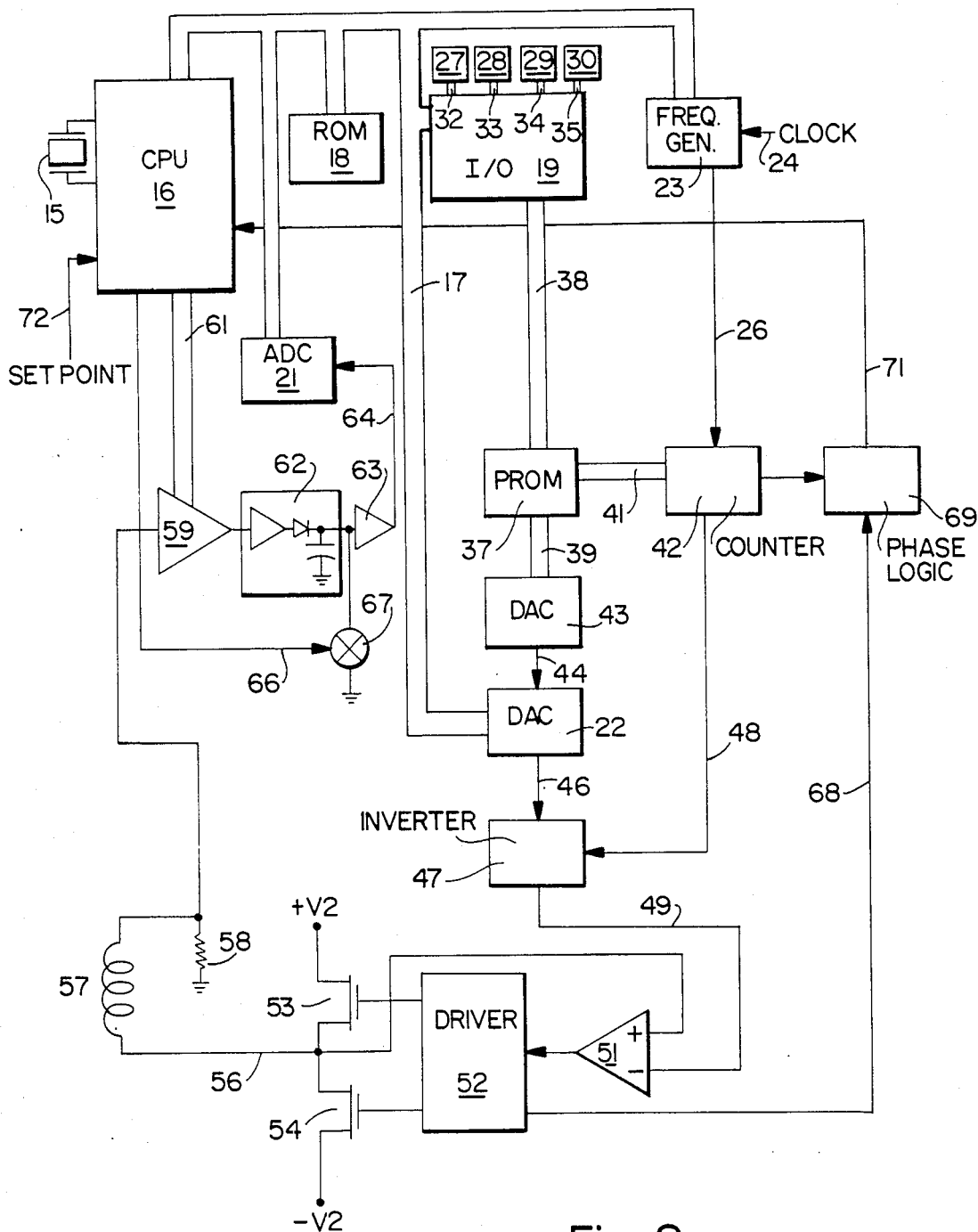
FIG. 2 is a block diagram of the invention.

A block diagram for the electrical control circuitry used with the vibratory material feeder shown in FIG. 1 is shown in FIG. 2.

The preferred embodiment is based around central processing unit (CPU) 16 which can be, for example, a type 8031 microprocessor manufactured by Intel Corporation. A system clock signal of 7.3728 MHz is provided to CPU 16 by crystal oscillator 15. Connected to CPU 16 by data/address bus 17 are read only memory (ROM) 18, input/output (I/O) controller 19, analog to digital converter (ADC) 21 and digital to analog converter (DAC) 22.

In the preferred embodiment, ROM 18 is a type 2732 program memory, and I/O controller 19 is a type 8155 controller, both manufactured by Intel Corporation. ADC 21 can be, for example, a type 0844 analog to digital converter, and DAC 22 can be a type 0832 digital to analog converter, both manufactured by National Semiconductor Corporation.

Also connected to bus 17 is a variable frequency generator 23. Generator 23 can be, for example, a type 7955 frequency multiplier, manufactured by LSI Logic Corporation. Generator 23 accepts a high frequency clock signal on line 24, derived, for example, by dividing the system clock signal from oscillator 15, and produces a signal on line 26 which is a pulse stream containing a fraction of the pulses on clock line 24, dependent upon the value of the digital byte applied to generator 23 through bus 17. Thus, the frequency of pulses on line 26 is a fraction of the frequency of the pulses on line 24, the fraction being determined by the byte appearing on bus 17 under control of CPU 16.

Connected to I/O controller 19 are external switches 27-30 connected to controller 19 by four-bit buses 32-35. Switches 27 and 28 can be positioned to set the power span, switch 29 can be positioned to set the setpoint span, and switch 30 can be positioned to set the maximum power. Provision of switches 27-30 allows the controller of the present invention to be applied to an extremely wide range of vibratory feeders, while maintaining a high degree of accuracy for any particular feeder. Use of the parameters set by switches 27-30 will be explained in detail below with reference to the flow chart of FIGS. 6A-6D. Switches 27-30 each can be, for example, a type 74B10 binary coded rotary switch manufactured by Grayhill Corporation.

Programmable read only memory (PROM) 37 is used to store digital representations of half-period sinusoidal wave forms for the wave form generator of the present invention. PROM 37 can be, for example, a type 2732 EPROM manufactured by Intel Corporation. To improve accuracy and flexibility, 16 different magnitudes of half-period sinusoids are stored in PROM 37. An individual wave form is chosen by controller 19 through control bus 38 under control of CPU 16. The individual wave forms in PROM 37 are digitized into 256 different 8-bit values. Each 8-bit value is recalled from PROM 37 appears on bus 39 when addressed by bus 41 from counter 42. Counter 42 is driven by the variable frequency digital signal appearing on line 26 produced by frequency generator 23. Counter 42 can be, for example, a type 4040 counter available from Motorola Corporation. Counter 42 and PROM 37 cooperate to produce on bus 39 a series of 8-bit bytes representing a full-wave rectified sinusoidal wave form, the frequency of which is controlled by the frequency of the pulses on line 26, and the magnitude of which is controlled by CPU 16 via controller 19 through bus 38.

This digital representation on bus 39 is applied to DAC 43 which produces, on line 44, an analog full-wave rectified sinusoidal wave form corresponding to the digitized wave form appearing on bus 39. Line 44 is applied to DAC 22 which acts as a digitally controlled attenuator which is used to further refine the magnitude of the full-wave rectified sinusoidal wave form. DAC 22 can be, for example, a type 0832 digital to analog converter available from National Semiconductor Corporation. DAC 22 produces on line 46 a full-wave rectified sinusoidal analog wave form which has been reduced in magnitude from the analog wave form appearing on line 44 according to the byte applied to DAC 22 via bus 17 by CPU 16. Thus, course magnitude control is accomplished with PROM 37, and fine magnitude control is accomplished with DAC 22.

The full-wave rectified sinusoidal wave form appearing on line 46 is applied to controllable inverter 47 which is controlled by line 48 from counter 42. Inverter 47 is effective to selectively invert every other half period of the full-wave rectified wave form on line 46, to produce on line 49 a full wave unrectified sinusoidal wave form.

As a result, a precisely synthesized sinusoidal wave form is produced on line 49. In the present invention, the frequency of the signal appearing on line 49 is variable from 40 to 80 Hz in increments of approximately 1.7 mHz, with a magnitude variable from 0–5 Volts in increments of approximately 18 mV. These minimum increment sizes represent hardware limitation of the preferred embodiment. It will be understood that different increment sizes may be had with appropriate hardware changes.

The sinusoidal wave form on line 49 is applied to amplifier 51 and, in turn, to power driver 52. Power driver 52 drives power transistors 53 and 54 which are connected to positive and negative high voltage rails $+V2$ and $-V2$. Transistors 53 and 54 are commonly connected to line 56 which is connected to coil 57 of actuator (FIG. 1). Thus, coil 57 is driven with a sinusoidal wave form having precisely controlled magnitude and frequency.

The current returning from coil 57 passes through precision sense resistor 58 which produces a voltage proportional to the sensed current. This voltage is applied to variable gain amplifier 59, the gain of which is varied under control of CPU 16 through bus 61. Depending on the magnitude of the current, the gain of amplifier 59 is varied by CPU 16 to provide the highest possible resolution. The output of amplifier 59 is applied to sample/hold circuit 62 which serves to detect the peak of the sinusoidal current wave form. This peak is buffered by amplifier 63 and applied to ADC 21 through line 64 which in turn, applies an 8-bit byte representative of the sensed current peak to CPU 16 via bus 17.

As a result, the magnitude of the peak of the current passing through coil 57 is supplied to CPU 16 for processing. To sense a new peak current, sample/hold circuit 62 is reset under control of CPU 16 acting through line 66 and analog switch 67. Of course, other means may be employed to sense the current passing through coil 57 as long as indication of the magnitude of the current is supplied to CPU 16.

Analog switch 67, and all other analog switches in the present disclosure, are digitally controlled analog switches, for example, type DG 211 switches manufactured by Analog Devices Corporation.

Power driver 52 also provides a signal on line 68 which is a square-wave signal having transistions coincident with the zero-crossings of the current applied to coil 57. This provides information on the phase of the current.

Line 68 is applied to phase logic block 69 along with the voltage phase information produced by counter 42 on line 48. Phase logic 69 produces a pulse on line 71 having a pulse width corresponding to the phase difference between the voltage and current applied to coil 57. This phase pulse is provided to CPU 16 for processing.

Thus, CPU 16 calculates a magnitude and frequency of voltage to be applied to coil 57, and is provided with information regarding the magnitude and phase of the current passing through coil 57. CPU uses this information, as disclosed below in detail referring to FIGS. 6A-6D, in combination with the desired setpoint applied to CPU 16 through line 72, to maintain the vibratory feeder in a mechanical resonance, and to feed material at the desired flow rate according to the setpoint.

In the preferred embodiment, the setpoint signal on line 72 is a variable frequency digital signal having a frequency proportional to the desired material flow rate.

Figure 3:
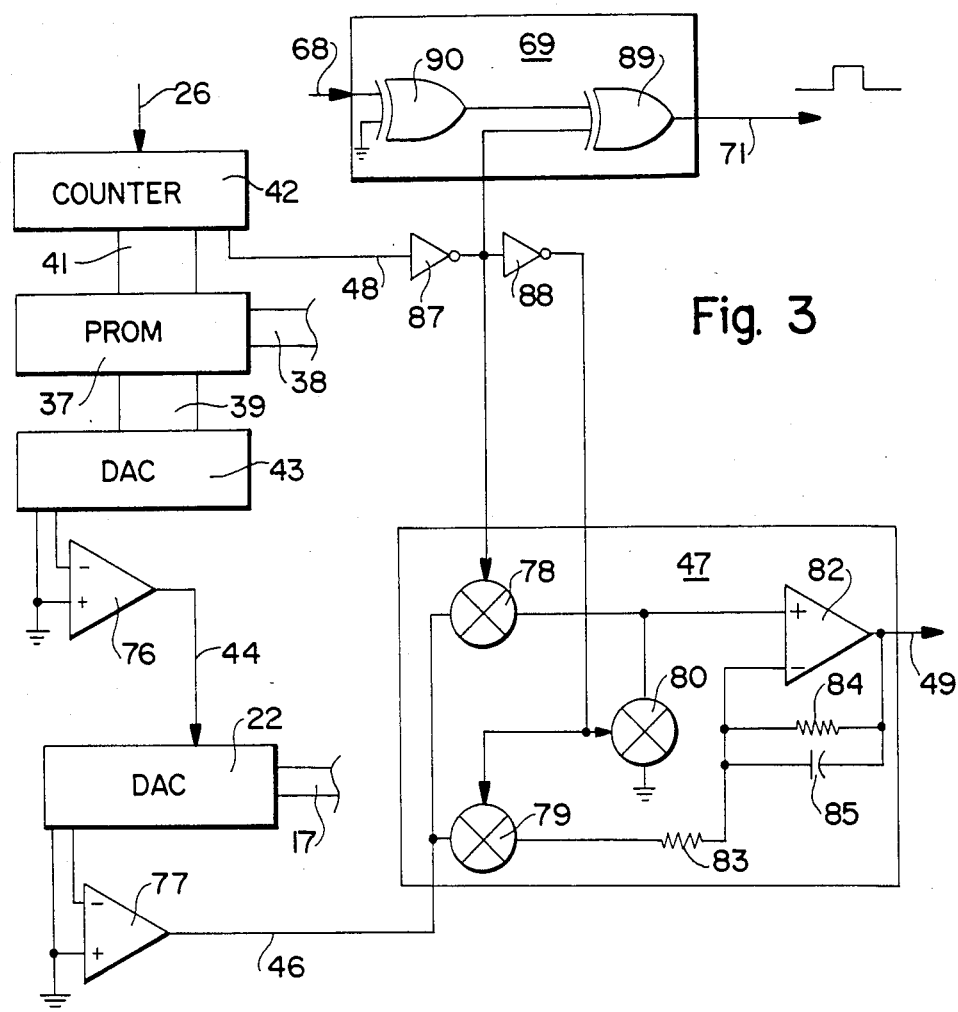
FIG. 3 is a detailed schematic of the wave form generator section of FIG. 2.
Figure 4:
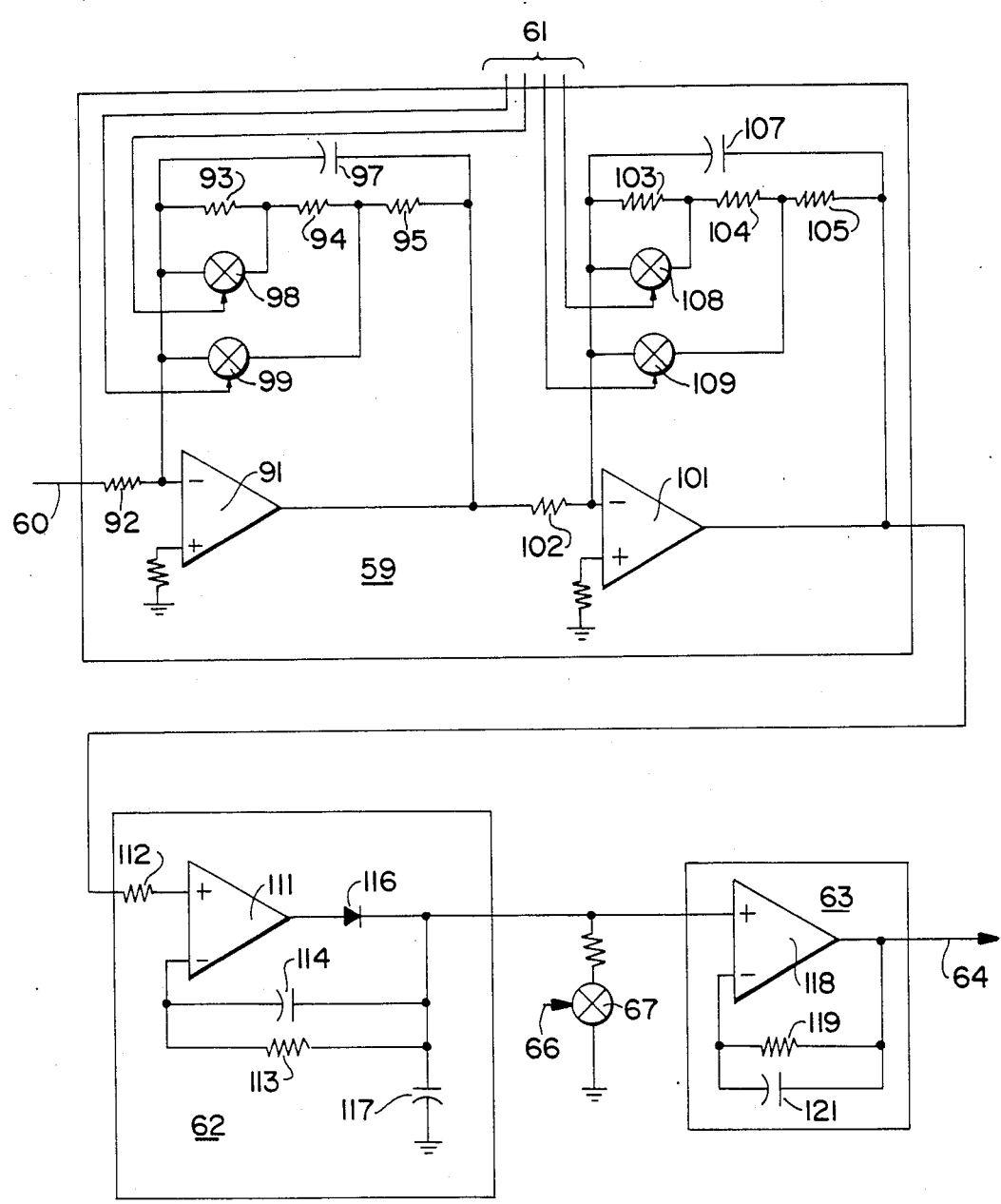
FIG. 4 is a detailed schematic of the current peak signal conditioner of FIG. 2.

Referring to FIGS. 3 and 4, the wave form generating and current peak signal conditioning circuits are discussed in detail.

The pulse stream frequency control signal on line 26 is applied to counter 42 which produces an 8-bit count on bus 41. This 8-bit count is applied to PROM 37 along with wave form selection information on bus 38 from controller 19 (FIG. 2). One of 16 digitized half-period sinusoidal wave forms stored in PROM 37 is chosen under control of bus 38, and one of 256 individual digitized points on the chosen wave form is selected under control of the count on bus 41. This digitized value is produced as an 8-bit byte on bus 39 and is applied to DAC 43. The output of DAC 43 is buffered by amplifier 76 to produce on line 44 a full-wave rectified sinusoidal analog voltage wave form corresponding to the sequence of 8-bit information on bus 39.

The analog signal on line 44 is applied to DAC 22 which is also connected to bus 17 from CPU 16 (FIG. 2). The output of DAC 22 is buffered by amplifier 77 to produce on line 46 a full-wave rectified sinusoidal analog voltage wave form. Buffer amplifiers 76 and 77 can be, for example, type 3240 operational amplifiers available from RCA Corporation.

The full-wave rectified wave form is applied to controllable inverter 47 which is also connected to line 48 from counter 42.

Line 48 is a digital signal having transitions which occur at the end of each half period of the full-wave rectified signal on line 46. In other words, a transition occurs on line 48 at the end of every 256 pulses occurring on line 26 as counted by counter 42.

Controllable inverter 47 comprises analog switches 78–80 and operational amplifier 82 with gain and feedback provided with resistors 83 and 84 and capacitor 85. Amplifier 82 can be a type 3240 operational amplifier available from RCA Corporation. Line 48 is applied to inverters 87 and 88 to control analog switches 78–80.

This results in a full-wave unrectified sinusoidal analog signal appearing on line 49.

The voltage phase signal appearing on line 48 is also applied, via inverter 87, to XOR gate 89 along with the output of XOR gate 90. The current phase signal appearing on line 68 is applied to XOR gate 90 which acts as a buffer. The output of gate 89 is a pulse having a width corresponding to the phase difference between the voltage and current.

Referring to FIG. 4, the details of the current peak sensing circuitry are disclosed. The sinusoidal current wave form on line 60, produced by sense resistor 58 (FIG. 2), is applied to variable gain amplifier 59.

Variable gain amplifier 59 comprises two similarly configured stages. A first stage includes operational amplifier 91 with gain resistors 92–95, and compensation capacitor 97. The effective value of the feedback resistance, and thus the gain of the first stage, is controlled by analog switches 98 and 99 under control of two lines from bus 61 connected to CPU 16 (FIG. 2).

The second stage of variable gain amplifier 59 includes operational amplifier 101 with gain resistors 102-105 and capacitor 107. Analog switches 108 and 109, under control of the two remaining lines of bus 61 are effective to modify the feedback resistance of amplifier 101, and thus the gain of the second stage is varied.

Amplifiers 91 and 101 can be, for example, type LF 412 operational amplifiers manufactured by National Semiconductor Corporation.

Variable gain amplifier 59 is therefore capable of 16 different gain settings under control of CPU 16 (FIG. 2) through bus 61 in order to provide the highest possible resolution when sensing the current.

The output of variable gain amplifier 59 is applied to sample/hold circuit 62 which comprises operational amplifier 111 gain resistors 112 and 113, compensation capacitor 114, rectifier 116 and storage capacitor 117. Connected between storage capacitor 117 and ground is analog switch 67 which is controlled by CPU 16 through reset line 66. The voltage on capacitor 117 is periodically reset by analog switch 67 under control of CPU 16 in order to update the peak current measurement.

Buffer amplifier 63, comprising operational amplifier 118, resistor 119 and capacitor 121, serve to provide a buffered signal on line 64 corresponding to the voltage on capacitor 117. Line 64 is then applied to ADC 21 to be digitized and applied to bus 17 for use by CPU 16 (FIG. 2). Amplifiers 116 and 118 can be, for example, type 3240 operational amplifiers available from RCA Corporation.

Figure 5:
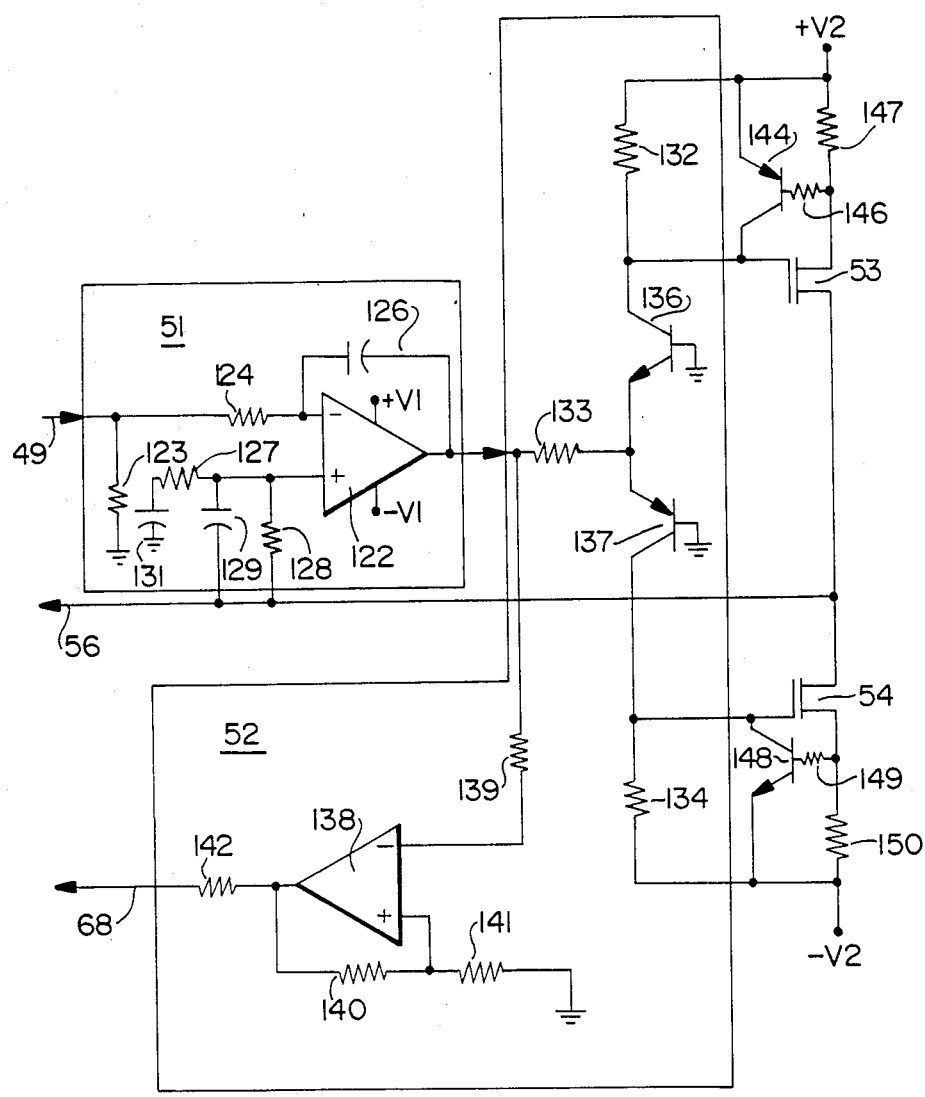
FIG. 5 is a detailed schematic of the power section of FIG. 2.

Referring now to FIG. 5, disclosed is the power section of the present invention. The sinusoidal voltage on line 49, produced by controllable inverter 47 (FIG. 2), is applied to amplifier 51. Amplifier 51 comprises operational amplifier 122 which is powered from positive and negative voltage rails $+V_1$ and $-V_1$ (for example, + and $-7.5$ Volts). Amplifier 122 is configured with resistors 123 and 124 and capacitor 126. Feedback from power output line 56 is provided with resistors 127, 128 and capacitors 129 and 131. The output of amplifier 51 is applied to power driver 52 which includes resistors 132, 133 and 134 and transistors 136 and 137. Also provided as part of power driver 52 is current phase detecting amplifier 138 configured with resistors 139-142. Amplifier 138 produces on line 68 a bipolar squarewave signal with transitions coincident with the zero crossing of the current supplied by line 56. Amplifiers 122 and 138 can be, for example, type TL082 operational amplifiers available from Texas Instruments Corporation.

Power driver 52 is used to drive the gates of power field effect transistors 53 and 54. These power FETs field effect transistors can be, for example, type 2SJ56 and 2SK176 MOSFETs metal oxide semiconductor field effect transistors, respectively, manufactured by Hitachi Corporation. Transistors 53 and 54 are respectively connected to positive and negative high voltage rails $+V_2$ and $-V_2$ (for example + and $-80$ Volts). Transistors 53 and 54 are commonly connected to power output line 56 which is connected to actuator coil 57 (FIG. 2).

Transistor 144 and resistors 146 and 147 provide over current protection for transistor 53, and transistor 148 and resistors 149 and 150 provide over current protection for transistor 54.

Although the configuration shown in FIG. 5 is a pushpull type linear amplifier, it will be understood that other types of amplifiers may be employed including switching type amplifiers.

Referring now to FIGS. 6A-6D, the computational steps performed by CPU 16 according to the present invention are disclosed. The flow charts shown in FIGS. 6A-6D are appropriately coded in machine language and are stored in program memory 18 shown in FIG. 2.

After initial power up, control exists in initialization block 161 wherein the hardware system is checked for errors and various flags and variables used in the program are initialized.

Control is then transferred to block 162 which begins the setpoint determination routine. In block 162, working RAM is initialized and the amplitude and frequency of the drive voltage are set to zero. Then, decision block 163 is entered wherein setpoint input line 72 is monitored until the digital sequence 1010 or 010 is sensed. When this digital sequence is sensed, control is transferred to block 164 where the frequency of the signal on line 72 is determined to determine the desired setpoint. This is done by counting the pulses appearing on line 72 for 250 msec. Control is then transferred to block 165 where the setpoint-update flag and first-pass flag are set.

After having collected the setpoint count, the main loop of the routine is entered beginning with decision block 166. In block 166, if the setpoint-update flag is set, control is transferred to the setpoint compare routine of block 167 shown in detail in FIG. 6B.

If the setpoint-update flag is not set, control is transferred to decision block 168 where the state of the first-pass flag is sensed. If the first-pass flag is set, indicating that the system has not yet been started, control is transferred to the first setpoint routine of block 169 shown in detail in FIG. 6C.

On the other hand, if the first-pass flag is not set, control is transferred to block 170 where a phase difference between the drive current and drive voltage is calculated.

In block 170, the pulses on line 71 are monitored by CPU 16 (FIG. 2) to determine the phase difference between the drive voltage and drive current. The pulse applied on line 71 is used to gate a counter within CPU 16 on and off. To improve accuracy, four phase measurements are taken and averaged. As shown in block 170, the average phase difference, $\phi_{AVE}$, is calculated using the equation: $\phi_{AVE} = (\phi_1 + \phi_2 + \phi_3 + \phi_4)/4$, where: $\phi_{1-4}$ are four consecutive phase difference measurements. Control is then transferred to process block 171 where the phase measurement taken in block 170 is converted from a number of clock counts to degrees using the equation shown. Specifically, $\phi° = \phi_{AVE} \times$ DRIVE FREQ$\times K_1$, where: $\phi°$ is the phase difference in degrees, $\phi_{AVE}$ is calculated in block 170, and DRIVE FREQ is the drive frequency, calculations for which are described below with reference to FIG. 6D. The constant $K_1$ is used to convert the units of clock count to degrees.

Control then passes to block 172 where the phase angle in degrees calculated in block 171 is used with a look-up table, having 1° steps, to determine the cosine of the phase. Control then passes to block 173 where the RMS value of the drive voltage is calculated from the present voltage amplitude setting. As shown in block 173, the RMS value of the drive voltage, $V_{RMS}$, is calculated using the equation: $V_{RMS}$=DRIVE AMPLITUDE$\times K_2$, where: DRIVE AMPLITUDE is calculated in block 179 (describd below), and $K_2$ is a constant for converting the drive amplitude to an RMS value.

Control then passes to block 174 where the RMS value of the current is determined. This involves sampling the output of ADC 21 which is a digitized version of the output of current sample/hold circuit 62 (FIGS. 2 and 4). The peak value is multiplied by an appropriate constant to produce the RMS value. Specifically, the RMS value of the current, $I_{RMS}$, is calculated using the equation: $I_{RMS} = I_{PEAK}/\sqrt{2}$, where: $I_{PEAK}$ is the peak current detected by sample/hold circuit 62. Also in block 174, reset line 66 is activated (FIGS. 2 and 4) after the peak current is sensed.

Control then passes to block 176 where it is determined if the gain of variable gain amplifier 59 (FIGS. 2 and 4) need be modified in order to provide optimum resolution of the current sensing circuitry. In block 176, the appropriate gain for amplifier 59 is calculated and appropriate lines within bus 61 are activated. Control then passes to block 177 where true power is computed using the cosine and RMS values calculated in blocks 172, 173 and 174. Specifically, true power, $P_M$, is calculated using the equation $P_M = V_{RMS} \times I_{RMS} \times \cos\phi°$, where: $V_{RMS}$, $I_{RMS}$ and $\cos\phi°$ are previously calculated in blocks 173, 174 and 172, respectively.

Figure 6A:
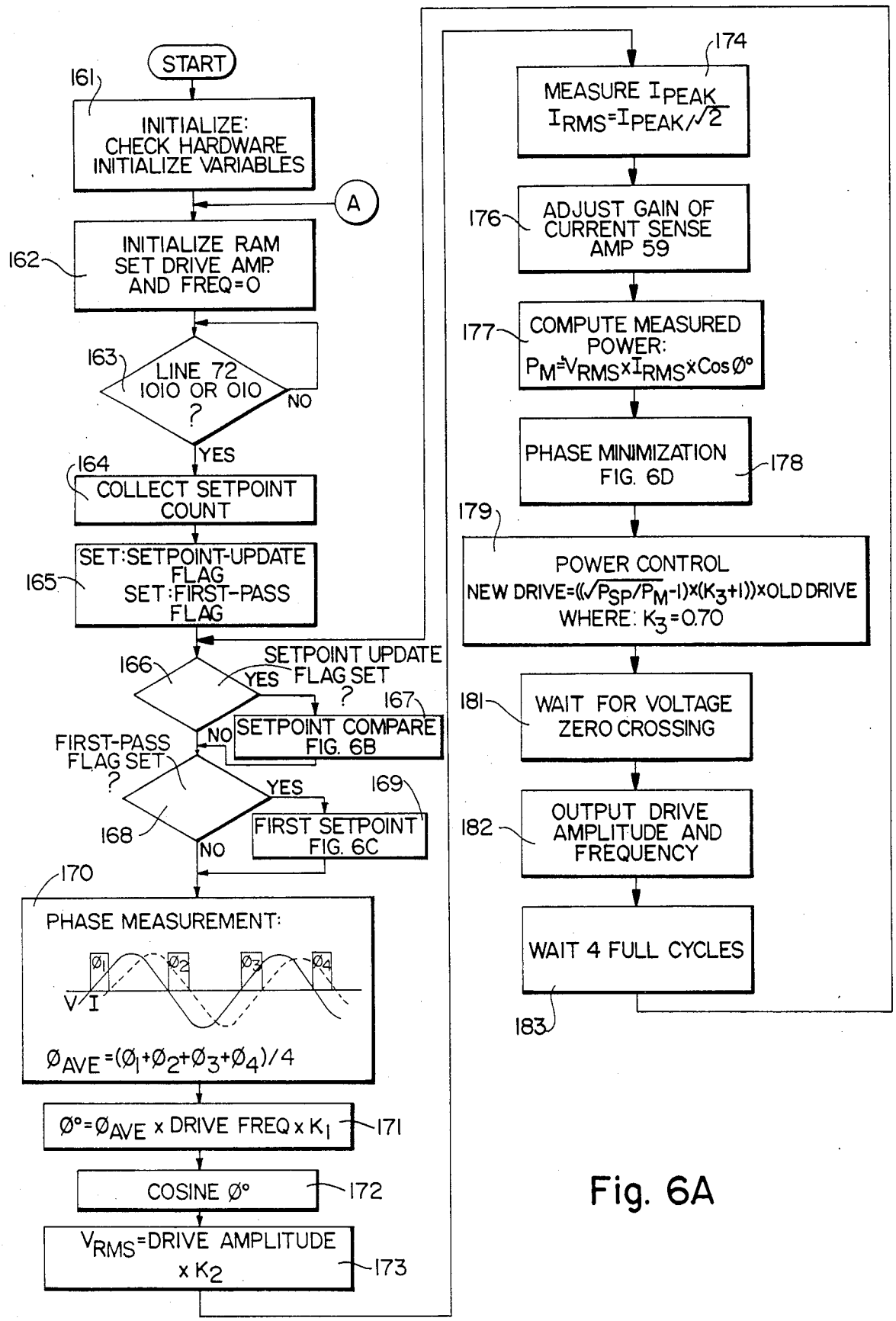
FIGS. 6A-6D are flow charts of the computational steps of the invention.

Control then passes to block 178 where phase minimizaton is performed. The details of the computational steps of block 178 are shown in FIG. 6D. After exiting block 178, power control is accomplished in block 179. In block 179, the new drive voltage amplitude is calculated using the equation shown. Specifically, the new drive amplitude, NEW DRIVE, is calculated from the old drive amplitude, OLD DRIVE, using the equation: NEW DRIVE$=((\sqrt{P_{SP}/P_M}-1)\times(K_3+1))\times$OLD DRIVE, where: $P_{SP}$ is the set point power calculated in block 201 (described below), $P_M$ is the detected power calculated in block 177, and $K_3$ is 0.70. The new drive voltage amplitude is proportional to the old drive voltage amplitude multiplied by the square root of the ratio of the desired setpoint power, calculated in block 167, to the measured power, calculated in block 177.

Control then passes to block 181 where a zero crossing of the voltage wave form is awaited. When zero crossing is detected, control passes to block 182 where the newly calculated drive amplitude and drive frequency are output. As mentioned above referring to FIG. 2, amplitude is set using course control with PROM 37 and fine control with DAC 22, and frequency is set using the pulse stream on line 26 generated by frequency generator 23 under control of bus 17. Control then passes to block 183 where four full sinusoidal cycles are awaited in order to assure system stability before retracing the loop beginning again with decision block 166.

Referring to FIG. 5B, the setpoint-compare routine is described. The routine of FIG. 5B is performed within block 167 of FIG. 5A.

In block 186, the setpoint-update flag is cleared and control is transferred to block 187 where the measured setpoint count is normalized. This is accomplished by reading the setpoint code switch (switch 29 connected to bus 34, FIG. 2), and normalizing the setpoint count by multiplying the setpoint count by a corresponding multiplier. For example, if a setpoint pulse frequency of 10 kHz represents maximum power, switch 29 is set to a first position and a first multiplier is used. If 1 kHz represents maximum power, switch 29 is set to a second position and a second multiplier, ten times larger than the first multiplier, is used, and so forth. This allows a number of different setpoint generators to be connected to line 72 (FIG. 2).

Control then passes to decision block 188 where, if the normalized setpoint count is zero, control returns to block 162 to await entry of a new setpoint. If the setpoint count is not zero, control passes to block 189 where the new normalized setpoint count is compared to the old normalized setpoint count. If a difference of greater than two is sensed, control is transferred to block 191, where the new-setpoint flag is set, and then on to block 192. If a new setpoint is not sensed in block 189, control passes directly to block 192 where the maximum power switch 30, connected to bus 35 (FIG. 2) is sensed. In the preferred embodiment, switch 30 can assume nine different positions corresponding to nine different maximum powers. These powers vary in binary progression from one Watt to 512 Watts (i.e., 1W, 2W, 4W, ... 512W).

Control then passes to decision block 193 where it is determined if the maximum power switch, sensed in block 192, has changed. If so, control passes to block 194, where the new-setpoint flag is set, and then on to block 196. Otherwise, control passes to immediately to block 196 where switches 27 and 28, connected to buses 32 and 33 (FIG. 2), are sensed to determine the power span. The power span allows a final adjustment of the maximum power. For example, if a 25 Watt feeder is being controlled, maximum power switch 30 is set to the fifth position corresponding to $2^5$ or 32 Watts, and power span switches 27 and 28 are set to positions corresponding to approxmiately 78%. Then when the maximum power and power span are multiplied together in block 201 described below, the desired maximum power of 25 Watts results. This maximum power corresponds to the maximum setpoint frequency as indicated by the position of setpoint code switch 29.

Control then passes to decision block 197 where if a new power span has been set, control passes to block 198 where the new-setpoint flag is set, then on to block 199. Otherwise, control passes directly from block 197 to block 199 where the state of the new-setpoint flag is sensed. If the new-setpoint flag was set in block 191, 194 or 198, control passes to block 201 where a new power setpoint is computed using the measured normalized setpoint count in combination with the values determined by power span switches 27 and 28 and maximum power switch 30. Specifically, the power set point, $P_{SP}$ is calculated using the equation: $P_{SP} = $ (SP COUNT/5000)$\times$PWR SPAN$\times$MAX PWR, where: SP COUNT is collected in block 164 and normalized in block 187, PWR SPAN is determined by the position of switches 27 and 28, and MAX PWR is determined by the position of switch 30. This completes the setpoint-compare routine, and control returns to block 168 of FIG. 6A.

Figures 6B, 6C:
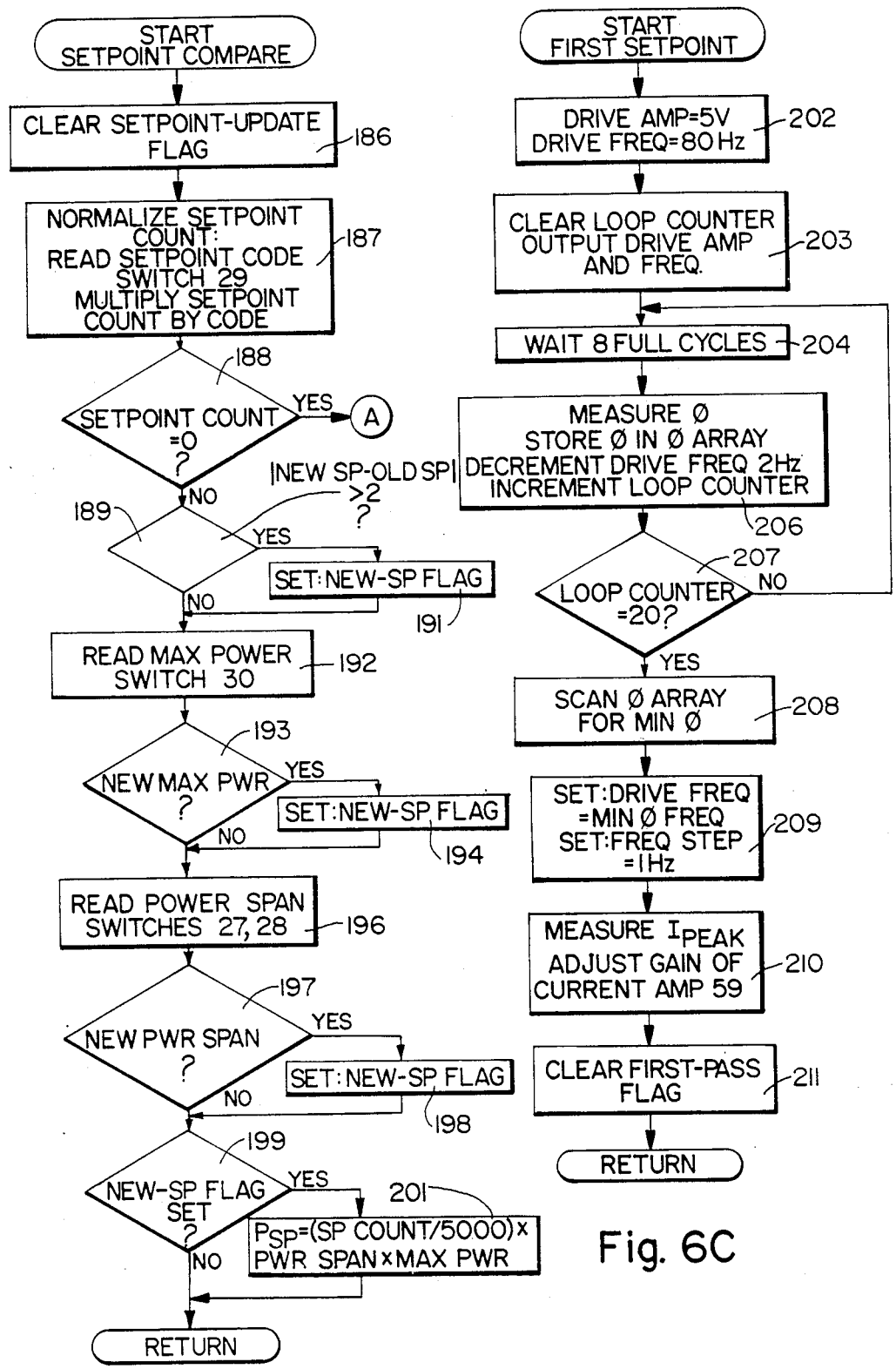
Figure 6D:
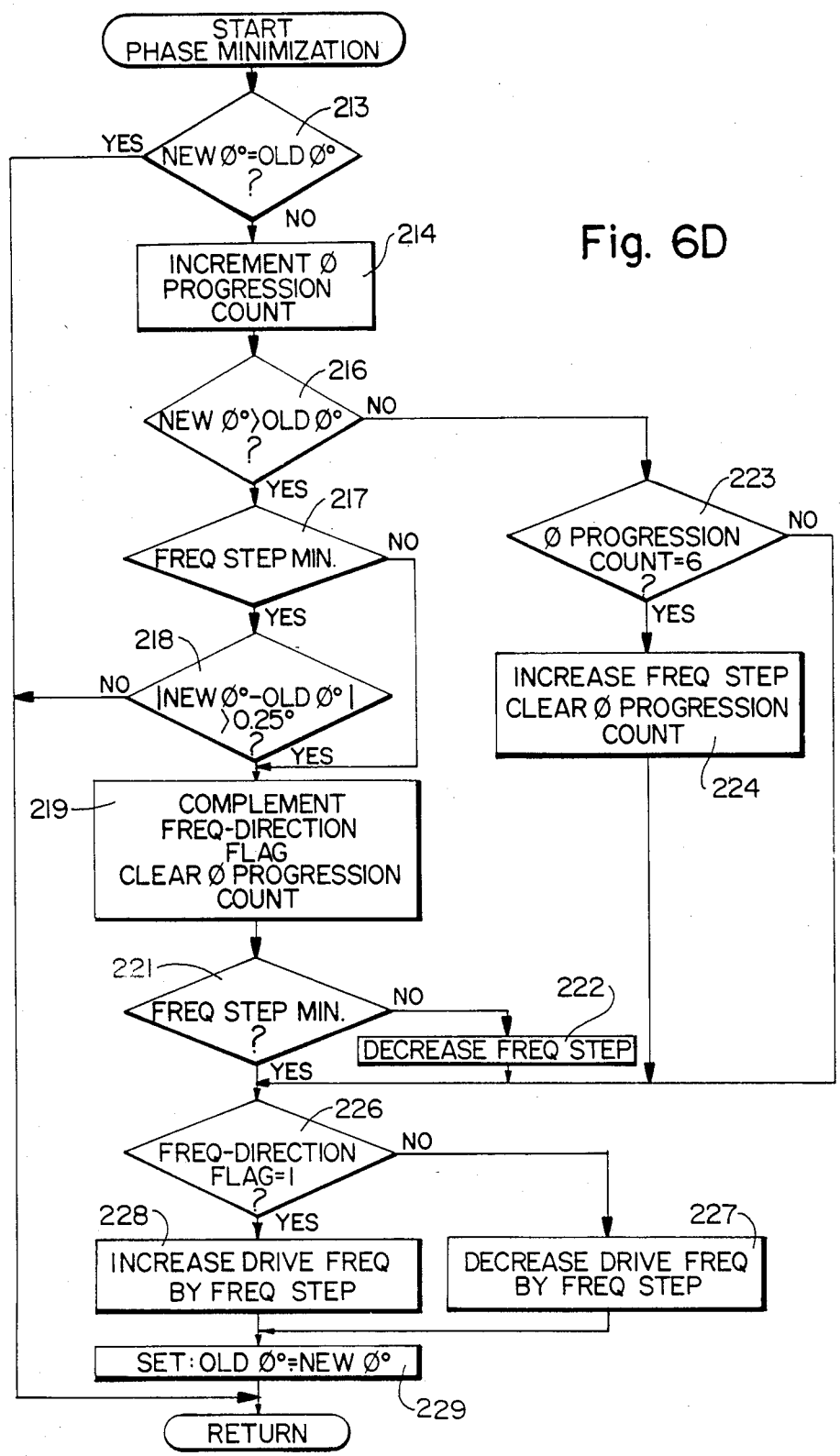

Referring to FIG. 6C, the first-setpoint routine is disclosed. The routine shown in FIG. 6C is performed within block 169 which is entered when block 168 of FIG. 6A determines that the controller is making its first pass through the control loop as indicated by the first-pass flag.

Beginning in block 202, the voltage drive amplitude is set to a maximum of five Volts, and the voltage drive frequency is set to a a maximum of 80 Hz. Beginning with block 203, initial phase minimization is begun. In block 203, the five Volt 80 Hz drive signal is applied to coil 57 (FIG. 2). Control then passes to block 204 where 8 full sinusoidal cycles are awaited. Control then passes to block 206 where the phase difference between the voltage and current are determined, in a manner similar to that performed in block 169 (FIG. 6A). The measured phase difference is then stored in a phase angle array, the drive frequency is reduced by a frequency step of 2 Hz and the loop counter is incremented. Control then passes to decision block 207 where it is determined if the loop has been traversed 20 times indicating that the phase angle array contains phase angles for 20 different drive frequencies. If not, control passes back to block 204 where the loop is retracted. If decision block 207 determines that 20 entries have been made, control passes to block 208 where the phase angle array is scanned to determine the smallest phase angle. Then, in block 209, the frequency corresponding to the smallest phase angle determined in block 208 is used for the drive frequency, and the frequency step size is reduced to 1 Hz. Control then passes to block 210 where the peak current is sensed, and the gain of amplifier 59 (FIG. 2) is adjusted to insure optimum resolution. In block 211, the frist-pass flag is cleared before returning control to block 170 of FIG. 6A.

As a result of the first-setpoint routine of FIG. 6C, the initial drive frequency is determined to be approximately equal to the mechanical resonance of the vibratory feeder, as evidenced by the minimum phase angle.

Referring now to FIG. 6D, the phase minimizaton routine is disclosed. These process steps are performed in block 178 of FIG. 6A.

Initially, the new phase is compared with the old phase in decision block 213. If the phases are identical, the phase minimization routine is immediately exited and control is returned to block 179 of FIG. 6A. If a difference between the new phase and the old phase is found in decision block 213, control passes to block 214 where the phase progression count is incremented. The phase progression count is an indicator of the degree of the discrepancy between the new phase and the old phase.

Control then passes to block 216 where the relative magnitudes of the new phase and the old phase are determined. If the new phase is greater than the old phase, control passes to block 217 where it is determined if the frequency step size is set to the minimum value. In the preferred embodiment, the minimum frequency step size is approximately 31.2 mHz. Although, as mentioned above, the hardware of the preferred embodiment is capable of a minimum frequency step size of 1.7 mHz, it has been determined that a minimum frequency step size of 31.2 mHz is sufficient for the disclosed preferred embodiment. The frequency step size can take one of seven values increasing in a binary progression beginning with the minimum step size (i.e., 31.2 mHz, 62.5 mHz, 125 mHz, 250 mHz, 500 mHz, 1 Hz and 2 Hz). If the frequency step size is minimum, control passes to decision block 218 where it is determined if the magnitude of the difference between the old phase and the new phase is greater than 0.25°. If not, the routine is exited and control returns to block 179 of FIG. 6A.

If the magnitude of the difference between the old phase and the new phase is greater than 0.25°, or if the frequency step size is not at the minimum value, control passes to block 219 where the direction of change in frequency is changed by complimenting the frequency-direction flag. The phase progression count is also cleared in block 219. Control then passes to block 221 where it is determined if the frequency step size is at a minimum. If not, control passes to block 222 where the frequency step size is decreased.

If block 216 determines that the new phase is not greater than the old phase, control passes to decision block 223 where the phase progression count is sensed and determined if equal to six. If so, the frequency step size is increased and the phase progression count is cleared in block 224. Control then passes to block 226. If decision block 223 determines that the phase progression count is not equal to six, control passes directly to block 226 where the frequency-direction flag is sensed. If the frequency-direction flag is not set, indicating that a decrease in drive frequency is required in order to minimize phase, control passes to block 227 where the drive frequency is decremented by the frequency step size. If the frequency-direction flag is set according to block 226, indicating that an increase in drive frequency is required to minimize the phase difference, control passes to block 228 where the drive frequency is incremented by the frequency step size. Control then passes to block 229 where the old phase is set equal to the new phase before returning control to block 179 of FIG. 6A.

As a result of the phase minimizaiton routine of FIG. 6D, the phase difference between the drive voltage and drive current is constantly monitored and the drive frequency adjusted to minimize the phase difference thereby maintaining the vibratory feeder in mechanical resonance.

By using a variable frequency step size, it is possible to use a greater step size when there is a large discrepancy between the phases of the current and voltage, or if drifting away from phase minimization is sensed. This condition is reflected by a large phase progression count. On the other hand, a very fine frequency step size is used if the phase difference indicates operation very near the mechanical resonant frequency. This condition is reflected by a small phase progression count.

The above detailed description is offered by way of example and not by way of limitation. Those skilled in the art may modify the disclosure without departing from the spirit and scope of the present invention as recited in the appended claims. For example, although the disclosed preferred embodiment uses a voltage drive and senses a drive current, a current drive could be used and a drive voltage could be sensed. Also, although sensing of only the drive current is disclosed, additional sense means could be added to sense the drive voltage rather than using the calculated value.

What is claimed is:

1. A vibratory material feeder comprising:
electromechanical vibratory actuator means for feeding material;
drive means for applying a substantially sinusoidal electrical drive wave form to said actuator means;
means for detecting a phase difference between a voltage and a current applied to said actuator means;
means, responsive to said phase difference, for controlling said drive means to minimize said phase difference whereby said actuator means is driven substantially in mechanical resonance;
means for detecting electrical power applied to said actuator means, and
means, responsive to detected electrical power, for controlling said drive means to apply electrical power to said actuator means to feed material at a desired rate, said means responsive to said detected electrical power including, means for storing a representation of at least a portion of at least one substantially sinusoidal wave form, means for recalling said representation, and means for adjusting an amplitude of said representation according to said detected electrical power.

2. A vibratory material feeder as recited in claim 1 wherein aid drive means comprises:
means for applying a substantially sinusoidal voltage to said actuator means, said voltage having a magnitude corresponding to said amplitude of said representation.

3. A vibratory material feeder as recited in claim 2 wherein said means for detecting electrical power comprises:
means for determining a magnitude of said current applied to said actuator means; and
means, responsive to said magnitude of said current, said magnitude of said voltage and said phase difference, for calculating electrical power applied to said actuator means.

4. A vibratory material feeder as recited in claim 3 further comprising:
means for setting said desired rate; and
wherein said means for adjusting said amplitude adjusts said amplitude proportional to a ratio of said desired rate and calculated electrical power applied to said actuator means.

5. A vibratory feeder as recited in claim 4 wherein said means for adjusting said amplitude adjusts said amplitude proportional to a square root of said ratio.

6. A vibratory material feeder as recited in claim 4 wherein said means for setting said desired rate comprises:
means for generating a stream of pulses having a repetition frequency proportional to said desired rate.

7. A vibratory material feeder as recited in claim 6 further comprising:
means for counting said pulses for a predetermined time to produce a setpoint count; and
programmable means for normalizing said setpoint count.

8. A vibratory material feeder comprising:
electromechanical vibratory actuator means for feeding material;
drive means for applying a substantially sinusoidal electrical drive wave form to said actuator means;
means for detecting a phase difference between a voltage and a current applied to said actuator means; and
means, responsive to said phase difference, for controlling said drive means to minimize said phase difference whereby said actuator means is driven substantially in mechanical resonance, said means responsive to said phase difference comprising means for storing a representation of at least a portion of at least one substantially sinusoidal voltage wave form, and means for recalling said representation at a recalling frequency determined by said phase difference.

9. A vibratory material feeder as recited in claim 8 wherein said means for storing comprises a programmable read only memory.

10. A vibratory material feeder as recited in claim 8 wherein said drive means comprises:
means for applying a substantially sinusoidal voltage to said actuator means, said voltage having a frequency proportional to said recalling frequency.

11. A vibratory material feeder as recited in claim 10 wherein said means responsive to said phase difference further comprises:
means for calculating said recalling frequency including means for increasing said recalling frequency if said phase difference indicates operation of said actuator means at a frequency below mechanical resonance, and means for decreasing said recalling frequency if said phase difference indicates operation of said actuator means at a frequency above mechanical resonance.

12. A vibratory material feeder as recited in claim 11 wherein said means for increasing increases said recalling frequency at a first rate if said phase difference indicates operation of said actuator means at a first frequency, and increases said recalling frequency at a second rate faster than said first rate if said phase difference indicates operation of said actuator means at a second frequency less than said first frequency.

13. A vibratory material feeder as recited in claim 11 wherein said means for decreasing decreases said recalling frequency at a first rate if said phase difference indicates operation of said actuator means at a first frequency, and decreases said recalling frequency at a second rate faster than said first rate if said phase difference indicates operation of said actuator means at a second frequency greater than said first frequency.

14. A vibratory material feeder comprising:
means, including electromagnetic vibratory actuator means, for discharging material;
means for driving said actuator means with a substantially sinusoidal electrical drive wave form;
means for calculating a phase difference between a current passing through said actuator means and a voltage across said actuator means;
means for calculating electrical power applied to said actuator means by said means for driving;
means for storing a representation of at least a portion of at least one substantially sinusoidal wave form;
means for recalling said representation at a recalling frequency to produce said electrical drive wave form;
means for adjusting a frequency of said substantially sinusoidal electrical drive wave form to maintain said means for discharging substantially in mechanical resonance, including means for adjusting said recalling frequency responsive to said phase difference; and
means for adjusting a magnitude of said substantially sinusoidal electrical drive wave form to discharge material from said means for discharing at a desired material discharge rate, including means for adjusting a magnitude of said representation responsive to calculated electrical power.

15. A method of discharging material including the steps of:
providing an electromechanical vibratory actuator for discharging material;
storing a representation of at least a portion of a substantially sinusoidal wave form;
recalling said representation at a recalling frequency to produce a substantially sinusoidal electrical drive wave form;
driving said vibratory actuator with said substantially sinusoidal electrical drive wave form;

calculating a phase angle difference between a current and a voltage applied to said vibratory actuator;

minimizing said phase angle difference by varying a frequency of said electrical drive wave form by varying said recalling frequency;

calculating electrical power applied to said vibratory actuator; and controlling a magnitude of said electrical drive wave form according to calculated electrical power by adjusting an amplitude of said representation to discharge material from said vibratory actuator at a desired rate.

* * * * *